Figure 2:
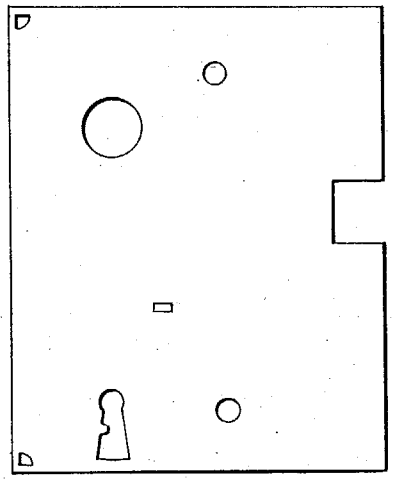

R. L. WEBB.

Reversible Latch.

No. 2,131. Reissued Dec. 19, 1865.

Witnesses;
Jno. Woodruff
Lucius Woodruff

Inventor
Rodolphus L. Webb

N. PETERS, Photo-Lithographer, Washington, D. C.

UNITED STATES PATENT OFFICE.

RODOLPHUS L. WEBB, OF NEW BRITAIN, CONNECTICUT.

IMPROVEMENT IN KNOB-LATCHES.

Specification forming part of Letters Patent No. 45,100, dated November 15, 1864; Reissue No. 2,131, dated December 19, 1865.

*To all whom it may concern:*

Be it known that I, RODOLPHUS L. WEBB, of New Britain, county of Hartford, and State of Connecticut, have invented certain new and useful Improvements in Knob-Latches; and I do hereby declare that the same is described and represented in the following specification, and to enable others skilled in the art to make and use the same, I will proceed to describe its construction by referring to the drawings, in which the same letters indicate like parts in each of the figures.

The nature of this improvement will be clearly understood from the specification and drawings, the object of which is to allow the latch to be drawn forward through the face-plate of the lock and turn a half-turn, so as to produce a right or left hand lock or latch, as desirable, and at the same time to provide a positive motion of the latch by the action of the knob-spindle through the hub, and so that it (this improvement) can be easily and readily applied to locks having the sliding horseshoe or vibrating lever or yoke actuated by a hub for drawing back the latch in the usual way.

Figure 1:
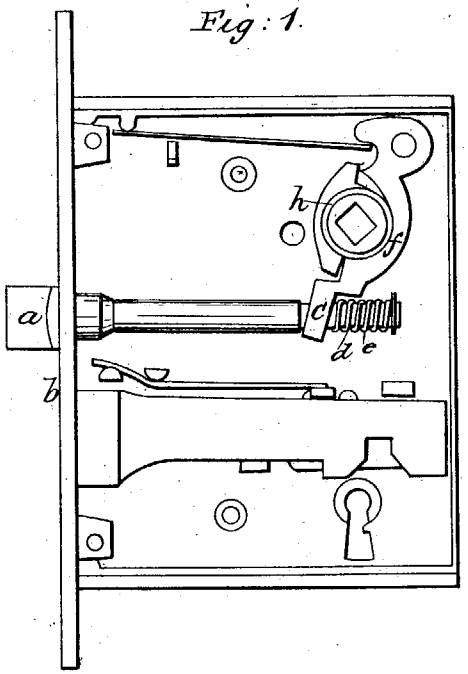

Figure 1 shows the interior of a lock. Fig. 2 shows the lock-plate turned over to one side of the lock.

All parts of this lock are made in the common way, except what relates to the operation of the latch-bolt.

*a* is a reversible latch, the basil or outer end of which is made a little larger one way than it is the other, where it enters the face of the plate *b*, so that when it is pulled forward to be turned it will only enter the said opening in the face-plate again when the face of the latch is parallel with the edge of the face-plate. The inner edge of the square portion of the latch is slightly basiled, so as to give it an easy tendency to re-enter the opening in the face-plate when turned nearly to its proper place, parallel with the edge of the face-plate. A short portion of the spindle, just back of the square, is turned round, of about the same diameter of the smallest way of the opening in the face-plate, for the purpose of steadying it (the latch) in place while being pulled forward and turned.

*c* is a collar made on or secured to a horseshoe or a yoke, *f*, and is provided with an opening to receive the rear end of the latch-spindle *d*. This collar, it will be easily seen, may be attached to or formed on the front end of the common sliding horseshoe or to the lower end of the vibrating lever or yoke *f*.

*e* is an elastic or coil spring, which, when compressed, I call a "solid washer," (spring or washer,) and is placed upon the back end of the latch-spindle *d*. This washer or spring *e* has two distinct functions in its combined capacity with the collar *c* and latch-spindle *a d*: First, it allows the latch *a* to be pulled forward out of the face-plate *b*, so as to be turned half revolution either to the right or left, and also holds the latch in its proper position when the knob-spindle hub *h* is at rest; second, when the hub *h* is turned (in the common way) to force back the horseshoe or yoke in the usual way, the collar *c* bears against the said spring (or washer) until it is compressed closely together, forming a solid body or washer, and thereby producing a positive motion to the latch *a*, which, if the movement of the spindle was dependent upon the joint action of the horseshoe or yoke and an elastic spring, a very slight bind or friction of said latch *a*, either in the lock or jamb-plates, would prevent its action.

Now, it will be seen that by the use of this improvement, when it is desirable to change, the lock or latch either to a right or left hand, it is only necessary to draw the latch *a* forward and give it a half-turn, when it will readily find its proper place in the face-plate.

This improvement may be applied to any lock now made without any material change, except adding collar *c* to the end of the horseshoe or yoke thereof.

I have thus endeavored to show the nature, construction, and advantage of this improvement, which I believe will enable a person skilled to make and use the same therefrom.

I claim—

The combination of the bolt *a*, yoke *f*, and spiral spring *e*, or its equivalent, when the latter is arranged so as to subserve the two functions before described, substantially as set forth.

RODOLPHUS L. WEBB.

Witnesses:

W. J. BRECKENRIDGE,

A. P. COLLINS.